United States Patent Office 3,474,118
Patented Oct. 21, 1969

3,474,118
PALLADOUS CHLORIDE-ACETYLENE REACTION PRODUCT
Robert J. Tedeschi, Whitehouse Station, and George L. Moore, South Plainfield, N.J., assignors to Air Reduction Company, Incorporated, New York, N.Y., a corporation of New York
No Drawing. Filed Dec. 19, 1967, Ser. No. 691,719
Int. Cl. C07f 15/00; C07d 107/00
U.S. Cl. 260—429
2 Claims

ABSTRACT OF THE DISCLOSURE

A complex of palladous chloride and acetylene is prepared by reacting palladous chloride with liquefied acetylene. The complex is useful as a catalyst for the polymerization and cyclization of acetylene.

---

This invention relates to derivatives of acetylene and is more particularly concerned with a complex of acetylene and a metallic salt.

Complexes of acetylene with certain compounds have previously been reported. For example, a complex of acetylene and ammonia is described by Tedeschi and his co-workers in J. Org. Chem., 28, 1740 (1963) and J. Org. Chem., 30, 3045 (1965), the latter publication also referring to complexes of acetylene and certain alkali metal hydroxides. A diacetylene-N-methyl-pyrrolidinone complex has also been isolated by N. Shachat, J. Org. Chem., 27, 2928 (1962).

It is an object of this invention to provide a novel acetylene complex.

In accordance with the invention it has been discovered that when acetylene in liquefied form is reacted with palladous chloride there is formed an acetylene-palladous chloride complex or adduct which contains one molecule of palladous chloride ($PdCl_2$) per molecule of acetylene with an apparent formula of

$$PdCl_2 \cdot CH \equiv CH$$

This compound is useful as a catalyst for polymerization or cyclization of acetylene and when so used is suitably supported upon a carrier of the type used for other catalysts for such reactions, or it can be employed in homogeneous solution.

In forming the complex of this invention, the reaction between the liquefied acetylene and palladous chloride is most advantageously carried out at a temperature of 15 to 50° C., preferably 20 to 35° C. The acetylene can be used in previously liquefied form, or gaseous acetylene can be liquefied in the reaction vessel itself by introducing the gaseous acetylene under pressure into the vessel at a low temperature so that the acetylene is cooled below its critical temperature.

The liquid acetylene used in accordance with this invention can be readily prepared by introducing compressed gaseous acetylene into a cooled vessel from a gas cylinder or other source. Ordinary cylinders of acetylene are at a pressure of about 250 p.s.i.g. when full. The acetylene can be used directly from the cylinder but preferably the pressure of the acetylene is increased to about 400 p.s.i.g. before the liquefaction step by introducing the acetylene into a pressure vessel or accumulator and pumping mineral oil into the bottom of the vessel until the desired acetylene pressure is obtained. As previously mentioned, the liquefaction of the acetylene is most readily effected in the autoclave or other vessel in which the reaction of the invention is to be carried out. Thus, the compressed gaseous acetylene is introduced into the reaction vessel which is suitably cooled to a sufficiently low temperature to cause liquefaction of the acetylene.

By using vapor pressure-temperature and density-temperature data such as found in V. J. Clancey, "Liquid and Solid Acetylene: A Review of Published Information" (England); Explosives Research and Development Establishment Survey 1/5/61, 1952, and in S. A. Miller, "Acetylene," Academic Press, pp. 506–516 (1965), the temperature needed for liquefaction of acetylene at a given acetylene pressure can be readily ascertained. In general, with an acetylene pressure of about 400 p.s.i.g., a temperature of −10 to −30° C. is sufficient to allow rapid liquefaction of the acetylene. Cooling of the reaction vessel, which is, of course, supplied with appropriate cooling coils or a cooling jacket, is readily achieved by means of any suitable cooling medium, and a particularly effective cooling medium is methanol which has been cooled by circulation through coils immersed in secondary butanol, or a mixture of ethylene glycol and methanol, containing pieces of solid carbon dioxide (Dry Ice). Heating of the reaction vessel is easily effected by circulating the methanol through a body of warm water.

In a preferred procedure, the palladous chloride is first introduced into the reaction vessel, which is, of course, a pressure vessel, such as an autoclave adapted to withstand the pressures encountered. The autoclave is then sealed except for valved feed and exit lines. The liquefied acetylene is then added, most suitably, as mentioned, by directly liquefying it in the vessel which has been cooled to the appropriate temperature for liquefaction of the acetylene at the pressure under which the acetylene is introduced. Exit and feed valves are finally closed and the temperature raised to the desired reaction temperature. The time of reaction will vary, but ordinarily it will be complete within 2 to 4 hours. However, the above-mentioned reaction time is not limitative of the invention, and shorter or longer times may be employed as required.

The palladous chloride and the acetylene are used in at least equimolar quantities, with an excess of acetylene preferred, and the molar ratio between the acetylene and palladous chloride being most advantageously at least about 5:1, preferably at least about 8:1. Higher ratios can be used but generally there is no advantage in a ratio above 25:1.

The reaction zone is freed from air and dried before the reactants are introduced. This is suitably effected by sweeping the reaction zone with a dry inert gas, such as dry nitrogen. After the reaction is completed, excess acetylene is vented and the complex which has been formed is then removed.

As mentioned, the reaction is suitably carried out in any reaction vessel adapted to be operated under gauge pressure, such as an autoclave suitably jacketed for temperature control and provided with an agitator, and the components of the reaction mixture are introduced by the use of conventional supply means, such as cylinders or tanks. The amounts charged to the autoclave are advantageously determined by the use of conventional gauging or measuring devices.

The invention will now be further illustrated by reference to the following specific example, but it will be understood that the invention is not limited to this illustrative embodiment.

EXAMPLE

The apparatus employed was a 125 ml. stainless steel high-pressure autoclave, which was equipped with an inner coil and jacket for heating and cooling and a suitable stirrer. The autoclave was dried by warming to about 50° C. and sweeping with $N_2$ prior to adding the palladous chloride. Anhydrous palladous chloride powder (8.88 g., 0.05 mole) was quickly introduced into the dry autoclave under a moderate current of dry nitrogen gas and the autoclave was then quickly sealed. Efficient cooling was effected by the use of a 2–3 gallon reservoir of ethylene glycol-methanol (1:1) in which a copper cooling coil was immersed. Copper lines from the coil exposed to the atmosphere and leading to the autoclave were insulated. The methanol cooling liquid in the system was circulated by means of a pump. By continual introduction of small pieces of solid carbon dioxide into the reservoir a temperature of −40° to −60° C. was readily reached.

After cooling to about −40° C., acetylene was condensed in the autoclave (44 cc. of liquid, 0.90 mole).

A moderate exothermic effect was observed on liquefaction which is readily controlled by the circulating heat exchange fluid. After all the acetylene has been liquefied into the reactor, the autoclave stirrer was turned on and the reaction temperature cautiously raised to the 25–30° C. range. No pronounced or significant exothermic effect was observed on raising the temperature. The reaction mixture was stirred at 22–32° C. for a total of three hours. The reaction pressure during the reaction varied between 590 and 710 p.s.i.g.

The autoclave stirrer was turned off. The autoclave vent line connecting to the vent stack draft was disconnected, and the autoclave vent valve was then very carefully and slowly opened to avoid a sudden pressure surge and the gas slowly vented through the meter.

The autoclave was opened under a positive pressure of nitrogen and the product palladous chloride-acetylene adduct or complex was removed. The product recovered represented a 98% conversion based on the salt used and was in the form of a granular solid of reddish color. Acetylene recovery data and calculations showed an equimolar $PdCl_2$-acetylene complex, viz. $PdCl_2 \cdot CH \equiv CH$.

It will be understood that various changes and modifications can be made without departing from the invention as above described, and without departing from the invention as defined in the appended claims. It is intended, therefore, that all matter contained in the foregoing description shall be interpreted as illustrative only and not as limitative of the invention.

We claim:

1. The process of producing a complex of palladous chloride and acetylene which comprises reacting palladous chloride with liquefied acetylene.

2. A complex of acetylene and palladous chloride.

References Cited

Collman et al.: J. Am. Chem. Soc., 89 (1967), pp. 844–851.

TOBIAS E. LEVOW, Primary Examiner

A. P. DEMERS, Assistant Examiner

U.S. Cl. X.R.

252—341; 260—94.1, 673